March 3, 1959   G. L. WIEBER   2,875,663
THREADLESS STUD ADAPTED FOR INSERTION IN KEYHOLE SLOT
Filed July 1, 1954
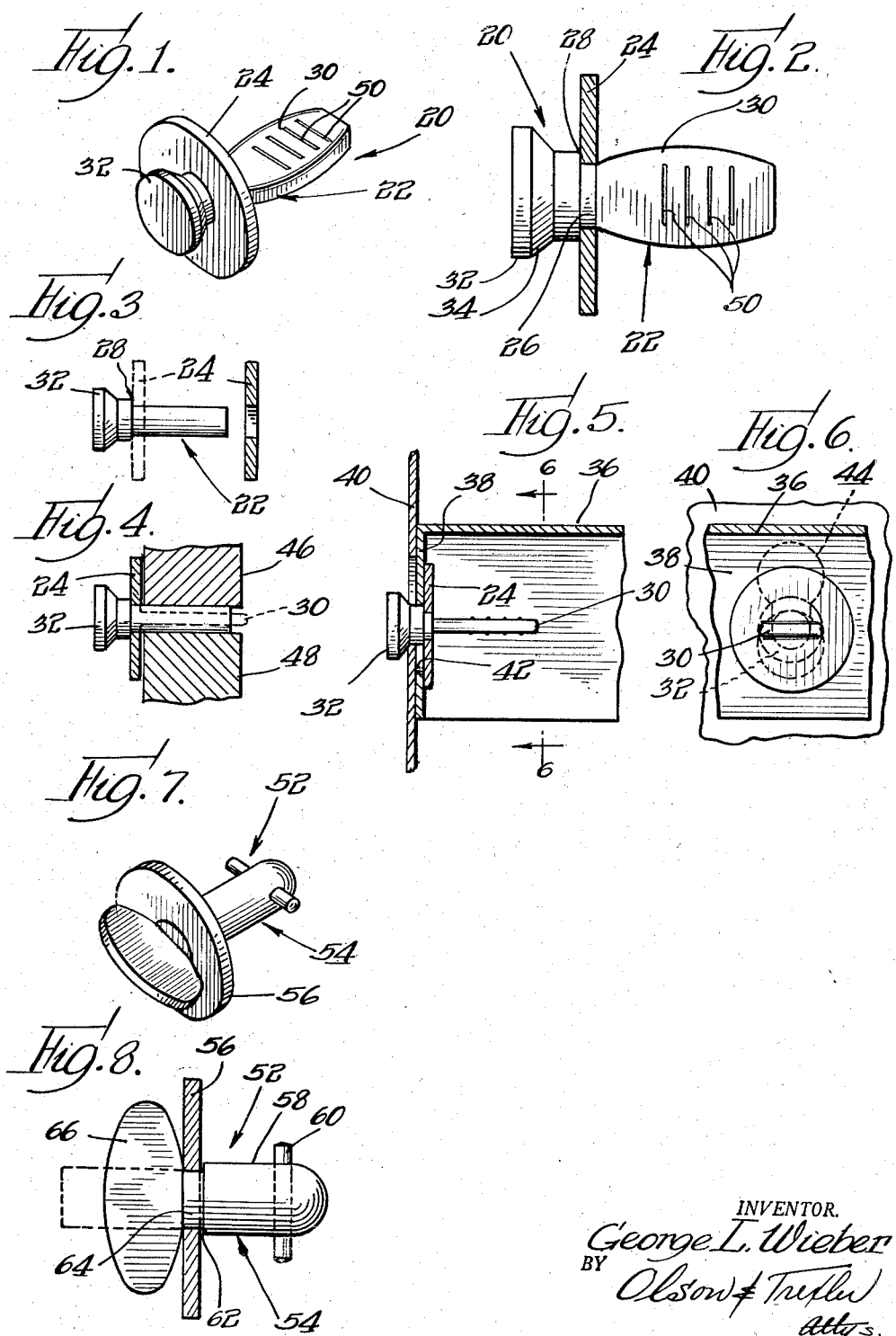
INVENTOR.
George L. Wieber
BY Olson & Trexler
Attys.

United States Patent Office 2,875,663
Patented Mar. 3, 1959

2,875,663

THREADLESS STUD ADAPTED FOR INSERTION IN KEYHOLE SLOT

George L. Wieber, Mount Prospect, Ill., assignor to Illinois Tool Works, Chicago, Ill., a corporation of Illinois Application July 1, 1954, Serial No. 440,599

1 Claim. (Cl. 85—8.6)

The present invention relates to a novel preassembled fastener unit and the method of making the same, and more particularly to a novel preassembled fastener unit including a stud member and a washer.

The present invention contemplates the provision of a novel preassembled fastener unit which may be used to connect a plurality of apertured workpieces and which includes a stud member and a washer permanently mounted on the stud member. An object of the present invention is to provide such a novel preassembled fastener unit which is of relatively simple and economical construction and wherein the washer is retained in assembled relationship with the stud member by a portion of the stud member also having another useful purpose.

Another object of the present invention is to provide a novel preassembled fastener unit of the above described type which is formed so that a minimum of stock material is required therefor so that the unit may be made more economically.

A further object of the present invention is to provide a novel and simple method of making a preassembled fastener unit of the above described type.

Other objects and advantages of the present invention will become apparent from the following description and the accompanying drawings wherein:

Fig. 1 is a perspective view showing a novel preassembled fastener unit embodying the principles of this invention;

Fig. 2 is a side view partially in cross section of the fastener unit shown in Fig. 1;

Figs. 3 and 4 are views illustrating the steps of making the fastener unit of Fig. 1 in accordance with the novel method of the present invention;

Fig. 5 is a cross sectional view showing the manner in which the fastener unit may be used for connecting a plurality of apertured workpieces;

Fig. 6 is a fragmentary cross sectional view taken along line 6—6 in Fig. 5;

Fig. 7 is a perspective view illustrating a modified form of the present invention; and Fig. 8 is a partial cross sectional view of the fastener unit shown in Fig. 7.

Referring now more specifically to the drawings wherein like parts are designated by the same numerals throughout the various figures, a fastener unit 20 embodying one form of the present invention is shown in Figs. 1–6. The unit 20 includes a stud member 22 and a washer 24 which may be a flat annular washer of the type shown or a spring washer or some other type of lock washer, not shown. As shown best in Fig. 2, the washer 24 is disposed on a portion 26 of the stud which has a diameter similar to the internal diameter of the washer. The stud is provided with enlarged shoulder means 28 for retaining the washer against axial movement in one direction and a flattened elongated portion 30 which retains the washer against axial movement in the opposite direction. The stud is also provided with an enlarged head 32 having an inwardly tapering surface 34 for the purpose set forth below.

As shown in Figs. 5 and 6 the fastener unit 20 may be utilized for connecting a plurality of apertured sheet metal workpieces together. More particularly, the fastener unit may be used for mounting a metal shelf 36 having an end flange 38 to an end support member or side 40 of a shell of a cabinet structure. The flange 38 is provided with an aperture 42 through which the head 32 of the stud may be inserted and which is sufficiently small to prevent passage of the larger washer 24. The member 40 is provided with a keyhole slot 44 which is adapted to receive the head of the stud. Thus, the head of the stud may be inserted through the larger portion of the keyhole slot and then moved downwardly so that the inwardly tapering or conical surface 34 of the head enters the narrow portion of the slot and functions to draw the washer 24 and thus the flange 38 toward the member 40. It will be appreciated that the space beneath the shelf 36 might be limited so that it would be difficult for an operator to assemble the fastener unit through the apertures or openings in the flange 38 and member 40. However, it should be noted that the flattened portion 30 of the stud member provides a grip which may be easily held by the operator either by hand or with a tool whereby positioning and assembly of the fastener unit with respect to the workpieces is greatly facilitated.

The method for making the fastener unit 20 is illustrated in Figs. 3 and 4. As shown in Fig. 3 the stud member 22 is initially provided with the above described shoulder means 28 and the enlarged head 32. The remaining portion of the stud member is initially provided with a substantially uniform transverse cross section throughout its length, which cross section is the same as the transverse cross section of the above described stud portion 26 on which the washer is located. The washer is then assembled over the end of the stud member by moving the washer from the solid line position shown in Fig. 3 to the broken line position at which the washer abuts the shoulder means 28. Then the shank of the stud member is flattened by any suitable means such as the dies 46 and 48 shown in Fig. 4. While the shank portion is flattened in one direction by the dies to the position shown in broken lines in Fig. 4 it will be appreciated that the shank is simultaneously expanded in a direction extending transversely of the dies to provide the above described flattened and expanded shank portion 30 which functions not only to retain the washer but also to provide a grip by which an operator may easily handle and position the fastener unit. During flattening of the portion 30 a plurality of ribs 50 are preferably formed in the broad flat surfaces thereof by the dies in order further to facilitate holding of the fastener unit by an operator. With this novel method it is seen that the washer is securely retained on the stud member at the same time that a useful portion or grip portion of the stud member is being formed whereby the need for any special operation such as a staking operation for retaining the washer is eliminated and economical production of the fastener unit is promoted.

In Figs. 7 and 8 there is shown a fastener unit 52 embodying a modified form of the present invention, which fastener unit is of the type generally known as a cowl fastener. Such cowl fasteners may be used to secure an apertured panel to a support having a complementary fastener member, not shown, thereon and in a well known manner. The fastener unit 52 includes a stud member 54 and a washer 56. The stud member comprises a shank portion 58 having a pin 60 extending transversely therethrough for cooperation with a complementary fastener member, not shown, in a known manner. An annular shoulder 62 is formed on the stud member and the washer is disposed on a shank portion 64 adjacent the shoulder. As shown in Fig. 8 the stud member 54 is initially formed so that an end portion thereof extends from the portion 64 as shown in broken lines. After the washer has been assembled on the stud member this end portion is flattened and expanded by suitable die means or in any other desired manner to provide a flattened grip portion 66 which not only serves to retain the washer but also enables an operator to hold and turn the stud member to any desired position either by hand or with a tool.

From the above description it is seen that the present invention has provided a novel preassembled fastener unit and method for making the same whereby the fastener unit may be rapidly and economically produced. More specifically, it is seen that the present invention has provided a novel fastener unit including a stud member and a washer wherein a swaged or otherwise flattened and expanded useful portion of the stud member also serves to retain the washer in assembled relationship with the stud member. It will also be appreciated that the stud members produced in accordance with the present invention may be made from a minimum of stock material.

While the preferred embodiments of the present invention have been shown and described herein it is obvious that many structural details may be changed without departing from the spirit and scope of the appended claim.

I claim:

An article of manufacture comprising a preassembled stud and washer adapted to connect a plurality of workpieces having aligned apertures at least one of which being in the form of a keyhole slot; said stud comprising a head of predetermined diameter adapted for insertion through the larger opening in a keyhole slot in one workpiece and the aperture in another workpiece and a shank portion including an intermediate section of minimum diameter and relatively short axial extent having said washer mounted thereon, said shank portion including a cylindrical section of relatively short axial extent between said intermediate section and said head and of an intermediate diameter relative to the diameters of said head and said intermediate shank section for presenting shoulder means abutting said washer, the free end section of the shank portion opposite said head being swaged to a flattened condition thinner in cross section in one direction than the minimum diameter of said intermediate section and expanded to a cross section greater than said minimum diameter in another direction for retaining the washer on the said intermediate section and against said shoulder means and said flattened shank section serving as a manipulating handle for the preassembled stud and washer, said washer being of a diameter larger than said head and adapted to abut the surface of the adjacent workpiece exteriorly around the aperture therein to limit movement of the preassembled stud and washer therethrough, and the side of said head joining the adjacent shank section of intermediate diameter being a conical surface tapering inwardly toward said intermediate section and adapted to serve as wedge means in cooperation with the surface of the adjacent workpiece to maintain the assembled workpieces in snug engagement between the head and the washer when the stud section of intermediate diameter is positioned in the narrower opening of the keyhole slot.

References Cited in the file of this patent

UNITED STATES PATENTS

| | | |
|---|---|---|
| 655,173 | Puddefoot | July 31, 1900 |
| 1,210,595 | Brubaker | Jan. 2, 1917 |
| 1,540,735 | Kroff | June 2, 1925 |
| 1,586,904 | Kuhn | June 1, 1926 |
| 2,098,721 | Demarest | Nov. 9, 1937 |
| 2,113,425 | Crowther | Apr. 5, 1938 |
| 2,246,457 | Schultz | June 17, 1941 |
| 2,372,653 | Becket | Apr. 3, 1945 |
| 2,552,066 | Sorensen | May 8, 1951 |
| 2,601,213 | Poupitch | June 17, 1952 |
| 2,672,069 | Mitchell | Mar. 16, 1954 |
| 2,684,515 | Zahodiakin | July 27, 1954 |
| 2,735,470 | Poupitch | Feb. 21, 1956 |

FOREIGN PATENTS

| | | |
|---|---|---|
| 650,741 | Great Britain | Feb. 28, 1951 |